May 27, 1969      F. L. LANDON      3,446,882
PROCESS OF FORMING A POLYSTYRENE STRUCTURE WITHIN A CONTAINER
Filed July 15, 1966
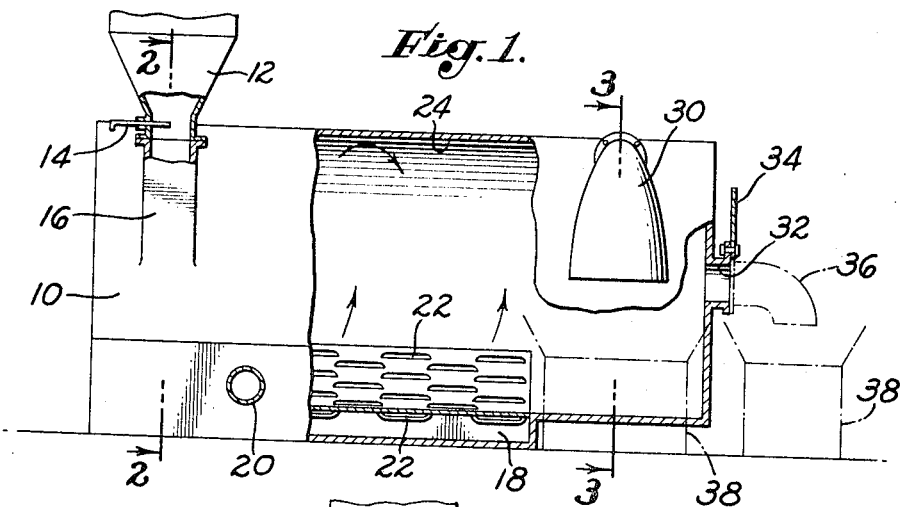
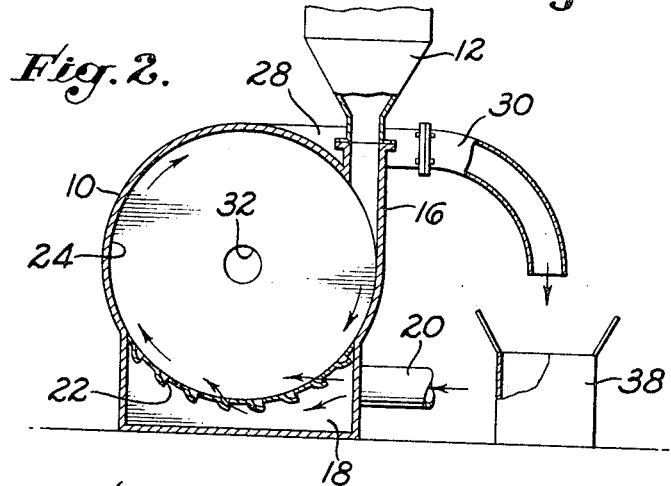
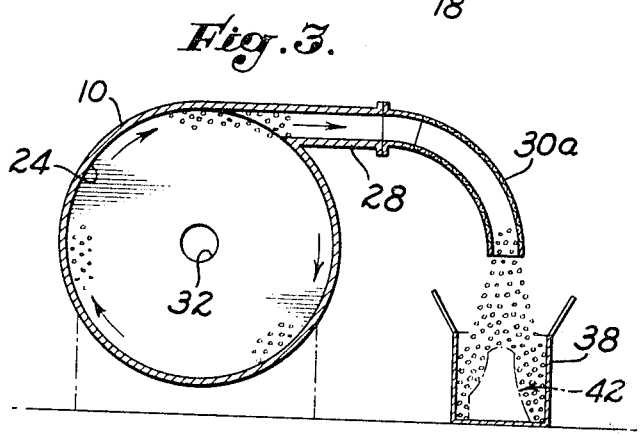
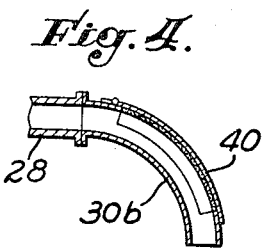
INVENTOR.
FRANK L. LANDON
BY HIS ATTORNEYS.
HARRIS, KIECH, RUSSELL & KERN

United States Patent Office 3,446,882
Patented May 27, 1969

3,446,882
PROCESS OF FORMING A POLYSTYRENE
STRUCTURE WITHIN A CONTAINER
Frank L. Landon, 855 Wick Lane,
Glendora, Calif. 91740
Filed July 15, 1966, Ser. No. 565,548
Int. Cl. B29h; B29d
U.S. Cl. 264—45                                 10 Claims

ABSTRACT OF THE DISCLOSURE

A rapid process for forming structures of expanded and fused polystyrene beads in a container or for cocooning an object therein, in which the beads are expanded by contact with a stream of hot air most of which is separated from the stream before the beads are delivered to the container. Sufficient heat is applied by the air to the beads so that the latent heat therein is sufficient to fuse the beads, thus eliminating the necessity of applying heat to the container to effect fusion of the expanded beads.

---

This invention relates generally to a process of forming polystyrene structures within containers and more particularly provides a novel and improved approach for molding expanded polystyrene beads to a desired structure and to a process for cocooning an object within a container.

For some years high density, unexpanded polystyrene beads containing entrapped gas-forming materials have been available commercially and have been widely used in various applications. Steam or hot air has been employed for expanding polystyrene beads. Hot air expansion, by the usual methods used to date, has required a longer expansion time than steam expansion, due to the lower specific heat of air as compared to steam, thus resulting in a lower heat transfer to the polystyrene beads. Air temperatures used should preferably not exceed about 240° F. or clumping will occur in the expander. The resulting beads are not hot enough to be transferred to the mold without cooling of the beads to a temperature at which a good fusing bond then becomes virtually impossible. In steam expansion, moisture condenses on the surface of the expanded beads and during transfer to the mold this lowers the temperature of the beads' surfaces below the fusion temperature of the polystyrene. For this reason it has not been possible to directly mold the beads from a steam expander. It has been necessary to dry the steam-expanded beads and thereafter transfer the expanded or partially expanded beads to a heat-jacketed mold wherein the beads are heated to the fusion temperature of the polystyrene at which temperature the beads will fuse to an integral mass in the form of the mold. It is not unusual to require an hour or longer to heat a jacketed mold to raise the temperature of the low K-factor, expanded beads to their fusion temperature. It will be appreciated that this requires the use of a steam boiler installation and is time consuming and drastically limits the number of objects that may be produced in a mold, all of which increases the cost of the polystyrene products. Additionally, the necessity of employing a heat-jacketed mold prevents the cocooning of heat-sensitive objects in a shock-protecting polystyrene structure.

It is a principal object of the invention to provide an improved process for molding polystyrene beads into any desired shape, the process using primarily the stored heat in newly expanded polystyrene beads and thus obviating the need of a heat-jacketed mold.

It is another object of the invention to provide a rapid process for the practice of polystyrene molding.

It is a still further object of the invention to provide a process which permits the cocooning of heat-sensitive objects without heat damage to the object.

It is a still further object of the invention to provide an improved process for polystyrene molding which obviates a separate initial step of steam or hot air expansion of the beads.

It is a further object of the invention to provide a process for casting of polystyrene articles which process requires no expensive heat-jacketed dies or boiler equipment.

In the process of the invention for forming polystyrene structures within a container, a stream of expanded or partially expanded polystyrene beads is delivered to the container with the surfaces of the beads being at or above the fusion temperature of the polystyrene and with the surfaces further characterized in being substantially free of moisture. The hot, newly expanded beads are introduced to the container, building up the desired structure therein and the beads are permitted to fuse into an integral mass. It is important to the practice of the process that the beads be free of moisture as evaporation of water on the surfaces of the expanded beads will lower their surface temperature below the fusion temperature and prevent formation of the structure. For this reason, conventional steam expansion cannot be employed in the process of the invention.

In a preferred form of the invention, the inner wall of the container prior to the introduction of the beads is preheated to substantially the fusion temperature of the polystyrene, this being done to minimize loss of heat from the beads which contact the wall surfaces of the container. As an alternative to preheating, it is possible to use low heat conduction materials in the molding container or to insulate the interior wall of the molding container, for instance by coating the wall surfaces with a layer of expanded polystyrene beads which are bonded together by an adhesive. However, the latter procedure is rather awkward and time-consuming and it has been found desirable in most instances to heat the container wall with a hot gas stream prior to the introduction of the beads. With large molds it has also been found desirable to hold the filled mold in a heated air environment (220° to 260° F.) for a short period of time to prevent too rapid cooling of the mold.

In the preferred embodiment of the process of the invention, the beads are expanded in a whirling stream of hot air created by a louvered jet stream principle, resulting in rapid heat exchange and typically have a temperature in the range of about 175° to 300° F. The beads are thereafter delivered at a high rate to a molding container, the rate being sufficient to prevent excessive heat loss prior to the beads being fully accumulated in the container, generally at a rate in excess of about 200 pounds per hour. Desirably, the hot air supporting the expanded beads is dissipated before passage of the beads to the container.

These and other objects and advantages of the process of the invention will be more completely understood in view of the following description and drawing wherein:

FIG. 1 is a side-elevational view, partially cut away, illustrating a hot air whirl-type expander using a louvered jet stream heat exchange principle, which expander is particularly suitable for the practice of the process of the invention;

FIG. 2 is a cross-sectional view taken along line 2—2 of FIG. 1;

FIG. 3 is another sectional view taken along line 3—3 of FIG. 1 illustrating the filling of a container through a directional spout; and FIG. 4 is a fractional, sectional view illustrating an alternative form of the filling spout of FIGS. 1–3.

An apparatus suitable for the practice of the process of the invention is illustrated in the drawing and there is illustrated a whirl-type expander 10 to which the unexpanded polystyrene beads are introduced from a hopper 12 through a slide discharge gate 14. The beads fall into the expander 10 through a downwardly extending, tangentially entering passageway 16. Hot air, typically in excess of 175° F. and generally in the range of about 175° to 300° F., and preferably in the range of about 220° to 270° F., is supplied to a plenum section 18 which forms the base for the whirl-type expander 10. The heated air enters the plenum section 18 via hot air duct 20. The air escapes from the plenum section 18 at a high speed through several elongated directional louveres 22 into a cylindrical bead expansion chamber 24 of the expander 10. The heated air whirls in a clockwise direction indicated in FIG. 2.

The high-density, unexpanded beads are introduced to the expansion chamber 24 adjacent one end thereof. The whirling air carries the beads therewith and heats them to the temperature required for expansion before the beads reach the other end of the chamber 24. In a typical expander suitable for use in the process of the invention the length of the expansion chamber 24 is approximately 8 to 20 feet with a diameter of about 4 to 10 feet. Heated air is supplied to the expander typically in a volume of about 4000 to 20,000 cubic feet per minute. Typically, the throughput of polystyrene beads will be in the range of about 3 to 20 pounds per minute.

The heated air which has been supplied to the expansion chamber 24 through the several louveres 22 along the bottom thereof moves laterally in a spiraling direction towards the discharge end of the chamber, carrying the expanding beads therealong. Since the beads are heavier than the air, they are thrown out against the inner wall of the expansion chamber 24 and leave with that part of the heated air which escapes through a tangentially extending duct 28. The tangential duct 28 empties into a downwardly turned filling spout 30.

A portion of air with no beads may be emitted from an axially located opening 32 at the exit end of the expander chamber 24. In the particular embodiment illustrated in FIG. 1 the axially disposed opening 32 is provided with a slide gate 34 which permits regulation of the amount of air passing therethrough. The opening 32 may empty into a downwardly-turned spout member 36, illustrated in phantom lines. The air leaving the spout 36 may be used for heating the container which is subsequently to be filled with the hot polystyrene beads.

The heated beads are caught in a container 38 and accumulated. It will be appreciated that the latent heat of the beads, if not dissipated, can be used to further expand the beads, if need be, and to fuse the beads into an integral mass or molded form. Excessive loss of heat through the container walls may interfere with the proper fusing of the beads adjacent to the walls and hence in the preferred practice of the invention, the container 38 will first be heated with hot air to raise the temperature of its walls to the fusing temperature of the polystyrene beads or thereabout, this being accomplished before the beads are introduced from the hopper 12 into the expander. Heating of the container 38 may be done by hot air from any source but preferably either passing through the downwardly-turned axially located spout 36 or through the bead-filling spout 30.

In FIG. 2, the spout 30 takes the form of a solid-wall downwardly-turned elbow. A solid-wall member such as this is satisfactory for preheating the container 38 prior to the introduction of the expanded beads. It will be appreciated that the directing of the hot air bead-laden stream into the container with such a high rate of air passage would result in the beads being blown from the container and in order to avoid this the apparatus is provided, as illustrated in FIG. 3, with another form of filling spout 30a which in this instance comprises a screen elbow. This arrangement serves to dissipate the air outwardly therefrom and the expanded beads fall as indicated in FIG. 3 into the container 38.

A still other form of filling spout is indicated in FIG. 4 wherein there is seen the outer surface of a downwardly-turned spout 30b provided with a screen over which there is disposed a hinged solid cover 40. During the preheating of a container, the solid cover 40 is left in the downward position indicated and at time of filling of the container with the polystyrene beads, the cover 40 is flipped upwardly to permit the escape of air through the underlying screen.

As illustrated in FIG. 3, the heated beads introduced into the container 38 form a cocoon about an article 42 within the container. The process of the invention is particularly applicable to a whirl-type expander which delivers large quantities of heated air at the discharge duct and expands beads at such a high rate of speed and in such a short period that the time of bead accumulation in the molding container is very short and therefore most of the stored heat in the newly expanded beads is trapped and available for further expansion and fusion. The process of the invention is unique in that no external heat need be applied to the container or mold to cause further expansion and fusion therein.

The process of the invention is particularly suitable to molding the newly expanded polystyrene to useful shapes as dictated by the shape of the container or to the cocooning of heat damageable objects, objects which could not be cocooned where a heat-jacketed mold is employed. It will be appreciated that as the beads build up within the container, the growing structure traps the heat and the trapped heat maintains the surface of the beads at the fusion temperature necessary for the formation of the integral mass. However, due to the low density of the polystyrene the B.t.u. of stored heat are so few that a cocooned object of higher density would not be materially raised in temperature.

The beads from the expander chamber 24 typically have a density in the range of about 1 to 7 pounds per cubic foot and a heat content in excess of 250 B.t.u., usually in the range of about 250 to 1750 B.tu., per cubic foot, which heat content is adequate to promote fusing. As mentioned above, the presence of moisture is to be avoided because it lowers the temperature of the beads' surfaces below the fusion temperature of the polystyrene. It will be recognized that the latent heat stored in the expanded polystyrene beads enables the beads to start molding outwardly; that is, from the inside of the beads or mass of beads. It is thus not necessary to apply additional heat to the outside of the expanded beads, as has been required in the past.

Still another advantage provided by the present invention is that the process may be practiced without the need for bulky equipment or boiler connections. Thus, the apparatus used in the process is highly mobile.

I claim:
1. A process of forming a polystyrene structure within a container, said process comprising:
   expanding polystyrene beads in an expansion zone in contact with a moving stream of air of a temperature sufficient to heat the expanded beads to a temperature of about 175–300° F., the expanded beads having latent heat stored therein and having surfaces that are at a temperature at least as high as the fusion temperature of the beads, thereby producing a stream of hot air with expanded polystyrene beads entrained therein, the surfaces of the expanded beads being substantially moisture free;
   quickly separating most of the hot air from said last-named stream while maintaining the surfaces of the beads above the fusion temperature thereof and then quickly delivering a stream of the separated ex- panded beads to a container while their surfaces are above said fusion temperature, thereby building up in the container a desired structure of such beads; and fusing the beads of said structure into an integral mass within said container, the process being further characterized by delivering the expanded polystyrene beads from the expansion zone directly to the container (1) in the absence of such cooling thereof as would reduce the surfaces thereof to a temperature below said fusion temperature and (2) at such rate that the latent heat in the expanded beads is sufficient to fuse them together in the absence of external heat applied to the container during the fusing of the beads into said integral mass.

2. A process in accordance with claim 1 wherein the beads delivered to the container have a density in the range of about 1 to 7 pounds per cubic foot and a heat content of about 250 to 1750 B.t.u. per cubic foot of the expanded beads.

3. A process in accordance with claim 1 wherein expansion of the beads is completed within the container.

4. A process in accordance with claim 1 wherein the container holds an object and the separated beads progressively build up a cocoon thereabout.

5. A process in accordance with claim 1 wherein the beads are expanded in a whirling stream of hot air having a temperature in the range of about 175° to 300° F. and then delivered to the container.

6. A process in accordance with claim 1 in which the expanded beads have a density in the range of about 1–7 pounds per cubic foot and a heat content of about 250–1750 B.t.u. per cubic foot, and in which the expanded polystyrene beads are delivered to the container at a rate in the range of about 3–20 pounds per minute.

7. A process in accordance with claim 1 in which said hot air is separated from said stream of hot air containing said beads by moving such hot air through a screen, producing effluent hot air on one side of said screen and leaving the beads on the other side of the screen moving toward the interior of the container for progressive building up of a mass of the expanded beads therein.

8. A process in accordance with claim 7 in which said hot air is separated during flow of the stream of bead-containing air along a curved spout at least one wall of which is screened to transmit to the outside of the spout said effluent hot air.

9. A process in accordance with claim 1 wherein the inner wall of the container prior to the introduction of the expanded polystyrene beads thereinto is perheated at least to the fusion temperature of the polystyrene beads but in which any external heating of said container is avoided during formation of said integral mass and the fusing of the expanded beads forming it.

10. A process in accordance with claim 9 in which the container is preheated by introducing thereinto, at a time before receiving the expanded beads, a portion of said hot air from said expansion zone.

References Cited

UNITED STATES PATENTS

| 2,981,984 | 5/1961  | Orr             | 264—45    |
| 3,065,500 | 11/1962 | Berner          | 264—53 XR |
| 3,207,820 | 9/1965  | Scarvelis et al.| 264—53    |
| 3,252,228 | 5/1966  | Ehrenfreund     | 264—53 XR |
| 3,278,658 | 10/1966 | Immel           | 264—51    |
| 3,285,795 | 11/1966 | Stein           | 264—45 XR |
| 3,328,497 | 6/1967  | Baxter et al.   | 264—53    |

OTHER REFERENCES

Teach. Polystyrene. New York, Reinhold, July 1960, pp. 128–131.

Heck, Friedrich "The Rationalised Conversion of Expandable Polystyrene to Shaped Packaging Containers," in German Plastics, pp. 12–14 of translation. Translation from and bound with Kunststoffe, vol. 53 (May 1963) pp. 305–312.

PHILIP E. ANDERSON, *Primary Examiner.*

U.S. Cl. X.R.

206—46; 263—21; 264—51, 112, 55, 345.